(12) United States Patent
Sasaki et al.

(10) Patent No.: US 7,139,456 B2
(45) Date of Patent: Nov. 21, 2006

(54) OPTICAL FIBER WIRING SHEET AND METHOD OF MANUFACTURING SAME

(75) Inventors: Kyoichi Sasaki, Shizuoka (JP);
Masayoshi Suzuki, Shizuoka (JP);
Tatsushi Kobayashi, Shizuoka (JP);
Ken Sukegawa, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 0 days.

(21) Appl. No.: 11/259,230

(22) Filed: Oct. 26, 2005

(65) Prior Publication Data

US 2006/0088258 A1 Apr. 27, 2006

(30) Foreign Application Priority Data

| Oct. 27, 2004 | (JP) | .............................. 2004-313003 |
| Dec. 15, 2004 | (JP) | .............................. 2004-362162 |
| Mar. 29, 2005 | (JP) | .............................. 2005-094176 |

(51) Int. Cl.
*G02B 6/44* (2006.01)

(52) U.S. Cl. ...................................... 385/114
(58) Field of Classification Search ................. 385/114
See application file for complete search history.

(56) References Cited

U.S. PATENT DOCUMENTS

| 5,155,785 A * | 10/1992 | Holland et al. ............... 385/89 |
| 6,483,972 B1 * | 11/2002 | Thompson et al. ......... 385/114 |
| 6,498,882 B1 * | 12/2002 | Buckelew et al. .......... 385/114 |
| 6,839,475 B1 * | 1/2005 | Kawase et al. ............... 385/14 |
| 6,937,808 B1 * | 8/2005 | Kawase et al. ............. 385/137 |
| 2002/0197033 A1 * | 12/2002 | Patel ........................... 385/114 |
| 2003/0044141 A1 * | 3/2003 | Melton et al. .............. 385/114 |
| 2003/0053772 A1 * | 3/2003 | Ikunishi et al. ............. 385/114 |
| 2003/0198446 A1 * | 10/2003 | Sun et al. .................... 385/115 |
| 2004/0213505 A1 * | 10/2004 | Saito et al. .................... 385/14 |
| 2004/0240812 A1 * | 12/2004 | Sun et al. .................... 385/114 |

FOREIGN PATENT DOCUMENTS

| JP | 2002-174759 | 6/2002 |
| JP | 2002-341205 | 11/2002 |

* cited by examiner

*Primary Examiner*—Michelle Connelly-Cushwa
*Assistant Examiner*—Chris H. Chu
(74) *Attorney, Agent, or Firm*—Knobbe, Martens, Olson & Bear LLP

(57) ABSTRACT

An optical fiber wiring sheet includes: at least one optical-fiber aligning section including a plurality of two-dimensionally aligned and wired coated optical fibers; and at least one optical-fiber branching part where at least one of the plurality of coated optical fibers branches off as a branching coated optical fiber from the remaining coated optical fibers. The coated optical fibers have ends which constitute optical input/output ports.

9 Claims, 13 Drawing Sheets

(a)

(b)

(c)

(d)

OPTICAL FIBER WIRING SHEET AND METHOD OF MANUFACTURING SAME

BACKGROUND OF THE INVENTION

1. Field of the Invention

The present invention relates to an optical fiber wiring sheet having a structure of branching coated optical fibers and used for optical circuit packages, optical circuit devices and other applications pertaining to optical communication and optical information processing, as well as a method of manufacturing the same.

2. Description of the Related Art

As optical fiber wiring sheets that bundle coated optical fibers, optical fiber tape cores have been known. Just like optical fiber cables, etc., optical fiber tape cores are used in applications where coated optical fibers must be stored in small-diameter cables at high density, and are also used for multi-core optical fiber wires connecting devices or components inside devices. Optical fiber wiring sheets such as optical fiber tape cores have a structure wherein coated optical fibers are aligned in a manner leaving no space in between and thus mutually affixed together. These optical fiber wiring sheets allow for composition of smallest structures for wiring coated optical fibers.

As the "last one mile" communication lines are fast changing to optical cables, a process is being needed in which multi-core optical fiber tape cores are branched and connected to individual subscribers. Accordingly, splittable integral optical fiber tape cores have been proposed that are made by arranging multiple optical fiber tape cores (hereinafter referred to as "primary tape cores") in parallel, and then integrating the primary tape cores by means of secondary covering of the entire tape cores or applying highly peelable coupling resin layers between the parallel primary tape cores (such as those disclosed in Japanese Patent Laid-open Publication Nos. 2002-341205 and 2002-174759).

However, although these optical fiber tape cores can be split into individual optical fiber tape cores by way of splitting the resin layers covering the primary tape cores, the production process for these optical fiber tape cores presents problems. Specifically, these optical fiber tape cores must be produced through a step for producing primary tape cores, followed by another step for coating the primary tape cores with coupling resin. This results in poor production efficiency. Also, it is not possible to split desired numbers of cores and use them as wiring members directly. In addition, producing optical fiber tape cores branching at desired positions requires that bundles of primary tape cores having different numbers of cores be prepared beforehand, which adds to cost. Furthermore, since the resin layer formed on primary tape cores is different from the coupling resin layer, the coupling resin layer peels easily and the broken fragments of coupling resin layer that peel off when the cores are branched can contaminate the surrounding environment.

To connect two devices using optical fibers, the optical fiber must be wired in accordance with the input/output ports on the applicable devices. In actuality, however, the input/output ports on the connected devices often do not have matching positions, in which case the devices cannot be wired using normal optical fiber tape cores because the optical fibers in these optical fiber tape cores are aligned in parallel. If input/output port positions do not match between the devices, the optical fibers of the optical fiber tape cores must be rearranged. Currently, an optical fiber fan-out cable, made of optical fibers that have been wired in such a way that they branch at desired positions, is used to connect input/output ports at desired positions. Alternatively, the optical fibers comprising optical fiber tape cores are separated, and then two pairs of individual optical fibers are connected via connectors or by fusing to rearrange the individual optical fiber tape cores at ends, to make an optical fiber tape again. In the case of an optical fiber fan-out cable, the cable sheath that protects the coated optical fibers is bulky and takes up space. Optical fiber fan-out cables are also less flexible than optical fiber tape cores and thus less easy to work with. In addition, optical fiber fan-out cables provide little advantage over connecting individual single-core optical fibers, and thus congestion of coated optical fibers occurs as the number of input/output ends increases. In the case of the latter method of separating optical fiber tape cores and then rearranging/reattaching them into a tape, the cover of optical fiber tape cores is removed first, and then the single-core optical fibers are individually fused together or attached via connectors. This reduces work efficiency.

As optical fiber wiring members that can align coated optical fibers and thus create desired wiring patterns, optical-fiber wiring plates having two-dimensionally wired optical fibers have been developed. However, these optical-fiber wiring plates have a drawback in terms of size, because they are larger than optical fiber tape cores.

In addition, production of optical fiber tape cores conventionally requires that a wiring pattern of optical fiber tape cores be designed to determine splitting positions in advance. This makes it impossible to split finished optical fiber tape cores into bundles consisting of desired numbers of cores or rearrange the cores.

SUMMARY OF THE INVENTION

The present invention is intended to solve the aforementioned various problems presented by the conventional technologies.

Specifically, one object of the present invention is to provide an optical fiber wiring sheet that can be branched at a desired position, as well as a method of producing the same.

Another object of the present invention is to provide an optical fiber wiring sheet that allows the alignment order of optical fibers to be changed to match the positions of input/output ports, while keeping the optical fiber wiring size to a minimum, as well as a method of producing the same.

Yet another object of the present invention is to provide a flexible optical fiber wiring sheet that can form, at desired positions, input/output ports equipped with desired numbers of coated optical fibers, thereby allowing optical connection, in an easy and space-saving manner, with desired input/output ports provided on optical circuit devices or optical-circuit storage devices.

The optical fiber wiring sheet according to an embodiment of the present invention has: at least one optical-fiber aligning section comprising two-dimensionally aligned and wired multiple coated optical fibers; and at least one optical-fiber branching section allowing the multiple coated optical fibers to branch to at least two directions from the optical-fiber aligning section; wherein the end of each coated optical fiber provides an optical input/output port.

The aforementioned optical fiber wiring sheet according to an embodiment of the present invention may have, in the optical-fiber aligning section, an optical-fiber rearranging part that changes the alignment order of coated optical fibers. In this case, the optical-fiber aligning section may form a loop. If the optical-fiber aligning section forms a loop, an optical input/output port comprising the end of a branched coated optical fiber can exist on both the outside and inside of the loop.

In the aforementioned optical fiber wiring sheet according to an embodiment of the present invention, the coated optical fibers branching at the optical-fiber branching section may form multiple optical-fiber aligning sections stacked on top of one another.

In the aforementioned optical fiber wiring sheet according to an embodiment of the present invention, the multiple coated optical fibers at the optical-fiber aligning section must be affixed in such a way that they do not come loose. For example, they can be integrally covered with a covering material. In this case, it is preferable that only one side of the optical-fiber aligning section, or the optical-fiber aligning section and optical-fiber branching section, be covered with a covering material. As the covering material, silicone rubber, particularly room-temperature vulcanizing silicone rubber, is preferable.

In the aforementioned optical fiber wiring sheet according to an embodiment of the present invention, it is preferable that the optical-fiber branching section be affixed by a protective member. As the protective member, a sheet member with adhesive layer, shrinkable tube member or resin can be used favorably. If the protective member consists of two sheet members, the optical-fiber branching section can be affixed by bonding between the two sheet members. In this case, it is preferable that one of the two sheet members be larger than the other sheet member.

The aforementioned optical fiber wiring sheet according to an embodiment of the present invention allows the coated optical fibers to be connected to an optical component at each optical input/output port. In this case, it is possible to place multiple units of the optical fiber wiring sheet and interconnect the optical fiber wiring sheets so that the coated optical fibers are connected to multiple optical components at each optical input/output port.

One method of producing the optical fiber wiring sheet according to an embodiment of the present invention comprises: a preparation step in which multiple coated optical fibers are aligned and placed on a two-dimensional plane; a covering step in which a covering material is applied simultaneously to the multiple coated optical fibers to form a covering layer over the coated optical fibers; and a branching step in which the multiple coated optical fibers are grabbed at given points and caused to move relatively so that the covering layer tears in the axial direction of coated optical fibers. These steps together produce an optical fiber wiring sheet that has at least an optical-fiber aligning section and an optical-fiber branching section, both of which have a covering layer formed on them.

In the aforementioned preparation step, the alignment order of coated optical fibers may be changed to allow an optical-fiber rearranging part to exist in the produced optical fiber wiring sheet.

In the aforementioned production method, a step in which a specified part is affixed by a protective member may be provided before or after the fiber-core branching step. For example, a step in which the optical-fiber branching section is encased by a sheet member with adhesive layer to affix the optical-fiber branching section; a step in which the optical-fiber branching section is sandwiched between two sheet members with adhesive layer to affix the optical-fiber branching section; a step in which the optical-fiber branching section is covered with a shrinkable tube member and then the tube member is shrunk to affix the optical-fiber branching section; or a step in which the optical-fiber branching section is coated with resin and then the resin is cured to affix the optical-fiber branching section, can be provided.

Another method of producing the optical fiber wiring sheet according to an embodiment of the present invention comprises: a preliminary covering step in which multiple coated optical fibers are aligned on a two-dimensional plane and then multiple structures are produced, each having a part to become a stacked optical-fiber aligning section, after which this part is covered with a covering material; a rearranging and branching step in which the pre-covered parts of the multiple structures are stacked on top of one another and then the alignment order of the multiple coated optical fibers is changed to form an optical-fiber branching section; and a covering step in which uncovered parts of the multiple coated optical fibers that have been aligned and wired on a two-dimensional plane are covered with a covering material. These steps together produce an optical fiber wiring sheet that has multiple optical-fiber aligning sections stacked on top of one another.

In this case, a step in which the optical-fiber branching section is affixed by a protective member can be provided. For example, the optical-fiber branching section may be coated with a covering material, such as liquid setting resin, followed by curing of the resin. Alternatively, the optical-fiber branching section may be covered with a shrinkable tube member, followed by shrinking of the shrinkable tube.

In an embodiment of the present invention, an optical-fiber aligning section refers to a part where multiple coated optical fibers are regularly lined up in parallel on the same plane. In an embodiment, an optical-fiber rearranging part refers to a part where the alignment order of individual coated optical fibers in an optical-fiber aligning section has been changed. In an embodiment, an optical-fiber branching section refers to a part where one bundle consisting of multiple coated optical fibers branches into multiple coated optical fibers or coated optical fiber bundles. In an embodiment, branching of optical fibers refers to splitting of a coated optical fiber bundle for the purpose of forming an optical-fiber branching section as explained above. In an embodiment, an optical-fiber branching part refers to a part of coated optical fibers branching off in the optical-fiber branching section. The interval between adjacent coated optical fibers can be set to a desired distance in accordance with the specification of the optical fiber wiring sheet to be produced. To allow uniform branching of optical fibers, however, it is desirable that this interval be kept constant.

In all of the aforesaid embodiments, any element used in an embodiment can interchangeably or additionally be used in another embodiment unless such a replacement or addition is not feasible or causes adverse effect. Further, the present invention can equally be applied to products and methods.

For purposes of summarizing the invention and the advantages achieved over the related art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

FIG. 8B is a cross-section view, taken along line Z–Z' of FIG. 8A, while

FIG. 14A is a perspective view showing one example of an optical fiber wiring sheet of the present invention, while

Figure 1:
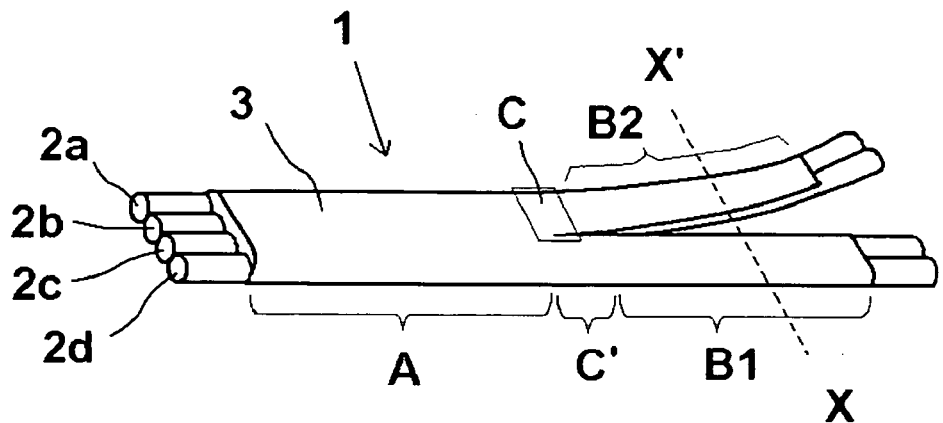
FIG. 1 is a perspective view showing one example of an optical fiber wiring sheet of the present invention.

Description of the Symbol: 1—Optical fiber wiring sheet, 2a through 2h—Coated optical fibers, 3—Covering material, 4—Substrate, 5—Substrate with two-dimensional plane, 6—Protective member, 7—Sheet with adhesive layer, 7a—Excess sheet area, 8—Tube member, 8a—Slit, 9—Resin (protection sleeve), 10—Single-axis control robot, 11—Color plate, 12—Ball-screw shaft, 13—Drive motor, 14—Bearing, 15—Movable unit, 16—Needle, 17—Forming jig, 18—Heat-shrinkable tube, 19—Rubber pipe, 20—Material feeding apparatus, 21—Adhesive tape, A, B—Optical-fiber aligning sections, C—Optical-fiber branching part, C'—Optical-fiber branching section, D—Optical-fiber rearranging part, E—Optical input/output port.

DETAILED DESCRIPTION OF THE PREFERRED EMBODIMENT

Embodiments of optical fiber wiring sheets according to an embodiment of the present invention are explained below, by referring to the drawings. The embodiments are not intended to limit the present invention.

Figure 2:
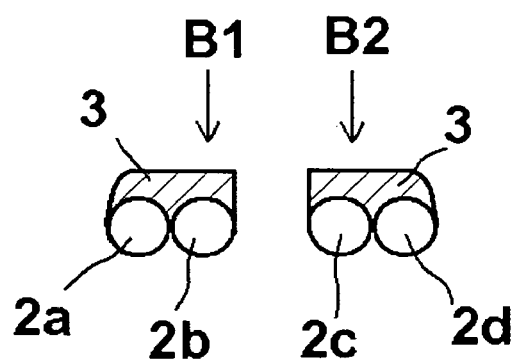
FIG. 2 is a cross-section view of the optical fiber wiring sheet, taken along line X–X' of FIG. 1.

FIG. 1 is a perspective view showing one example of the simplest form of optical fiber wiring sheet according to an embodiment of the present invention. The optical fiber wiring sheet is split into two bundles of coated optical fibers near the center and branched to two directions. In FIG. 1, the optical fiber wiring sheet (1) has: an optical-fiber aligning section (A) comprising four coated optical fibers (2a through 2d) that are aligned in parallel in a manner leaving no space in between; an optical-fiber branching section (C') that branches the bundle of coated optical fibers into two; and optical-fiber aligning sections (B1, B2), each comprising two coated optical fibers that are aligned in parallel. The optical-fiber aligning section (B2) includes an optical-fiber branching part (C) where the optical-fiber aligning section (B2) branches off from the optical-fiber aligning section (B1). The optical-fiber branching section (C') includes the optical-fiber branching part (C). These coated optical fibers are covered with a covering material (3) across the optical-fiber aligning sections and optical-fiber branching section, with the covering material forming a single covering layer over the top surface of these sections. The end of each coated optical fiber provides an optical input/output port. FIG. 2 is a cross-section view taken along line X–X' of FIG. 1. As shown in FIG. 2, the four coated optical fibers in optical-fiber aligning section A branch, at the optical-fiber branching section, into optical-fiber aligning section (B1) comprising two coated optical fibers (2a, 2b), and optical-fiber aligning section (B2) also comprising two coated optical fibers (2c, 2d).

Figure 3:
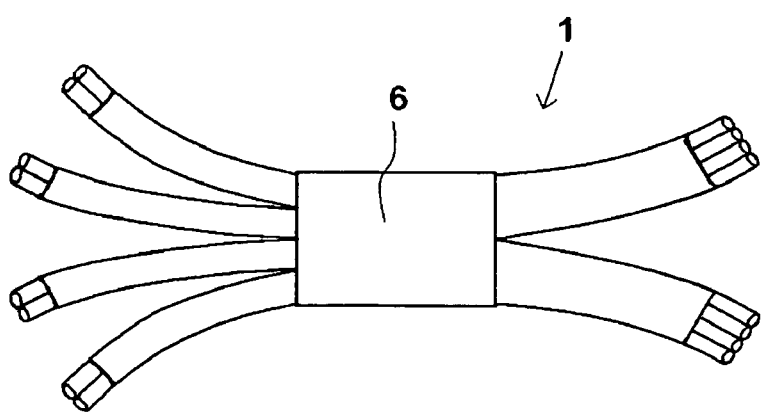
FIG. 3 is a top view showing one example of an optical fiber wiring sheet of the present invention.
Figure 4:
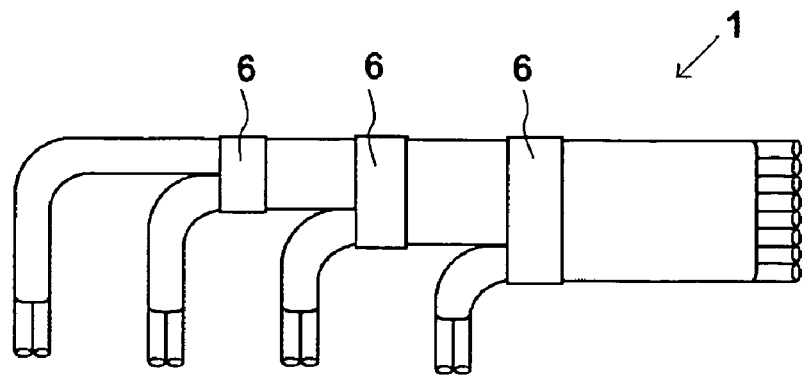
FIG. 4 is a top view showing one example of an optical fiber wiring sheet of the present invention.

In optical fiber wiring sheets according to an embodiment of the present invention, the number and positions of branching locations are not specifically limited and can be designed freely according to the specification. For example, an optical fiber wiring sheet (1) having a bundle of eight coated optical fibers branching into two bundles on one side and four bundles on the other side, as shown in FIG. 3, or an optical fiber wiring sheet (1) where desired numbers of coated optical fibers branch at specified intervals, as shown in FIG. 4, can be designed. Here, numeral 6 represents a protective member that protects and affixes each optical-fiber branching section. As explained in details below, this protective member may be a sheet with adhesive layer, a tube member such as a tube that shrinks under heat, ultraviolet light, etc., or resin.

Optical fiber wiring sheets according to an embodiment of the present invention may have in their optical-fiber aligning section an optical-fiber rearranging part that changes the alignment order of coated optical fibers. An optical fiber wiring sheet having an optical-fiber rearranging part is explained below.

Figure 5:
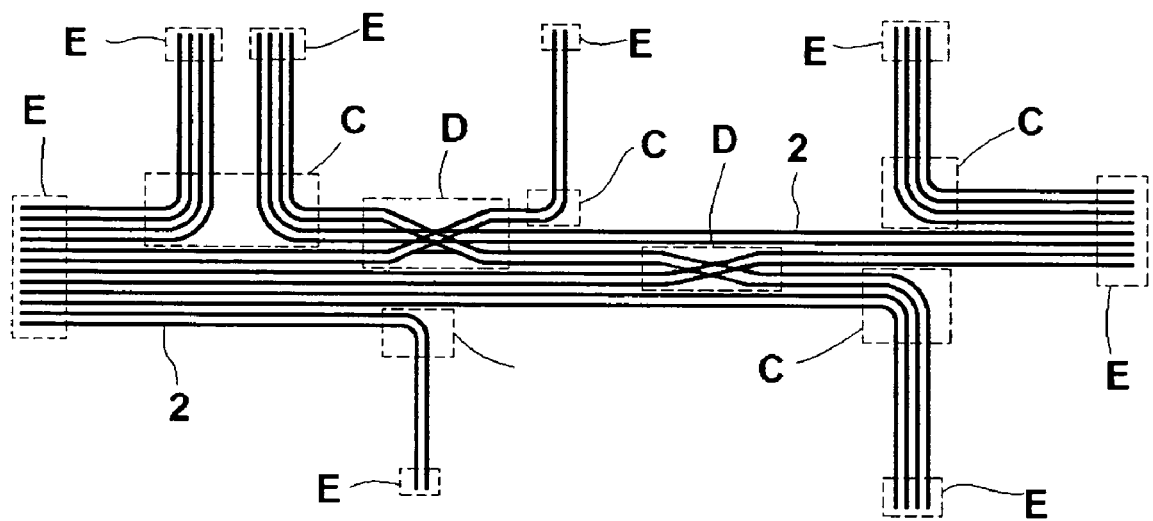
FIG. 5 is a diagram showing the wiring condition of coated optical fibers in one example of an optical fiber wiring sheet of the present invention.

FIG. 5 is a schematic diagram showing the wiring condition of an optical fiber wiring sheet according to an embodiment of the present invention, having optical-fiber rearranging parts and optical-fiber branching parts. In FIG. 5, numeral 2 represents a coated optical fiber, C represents an optical-fiber branching part, D represents an optical-fiber rearranging part, and E represents an optical input/output port. All other parts are optical-fiber aligning sections.

An optical-fiber rearranging part is where coated optical fibers are rearranged. By providing an optical-fiber rearranging part in an optical-fiber aligning section, properly aligned coated optical fibers can be branched on both sides of the optical-fiber aligning section, thereby allowing a desired arrangement of branched coated optical fibers to be formed on each side of the optical-fiber aligning section. If the coated optical fibers to be rearranged are congested, multiple optical-fiber rearranging parts may be provided in succession. To maintain alignment of coated optical fibers, normally it is desirable to rearrange two to four adjacent coated optical fibers in one optical-fiber rearranging part. There is no need to provide optical-fiber branching parts and optical-fiber rearranging parts alternately, and either two or more optical-fiber branching parts or two or more optical-fiber rearranging parts can be provided in succession, as long as the coated optical fibers branched at each optical-fiber branching part provide desired numbers of optical fibers at desired positions. Optical input/output ports are formed at the ends of coated optical fibers comprising an optical fiber wiring sheet. In FIG. 5, both ends of the optical fiber wiring sheet and ends of branched coated optical fibers provide optical input/output ports.

Figure 6:
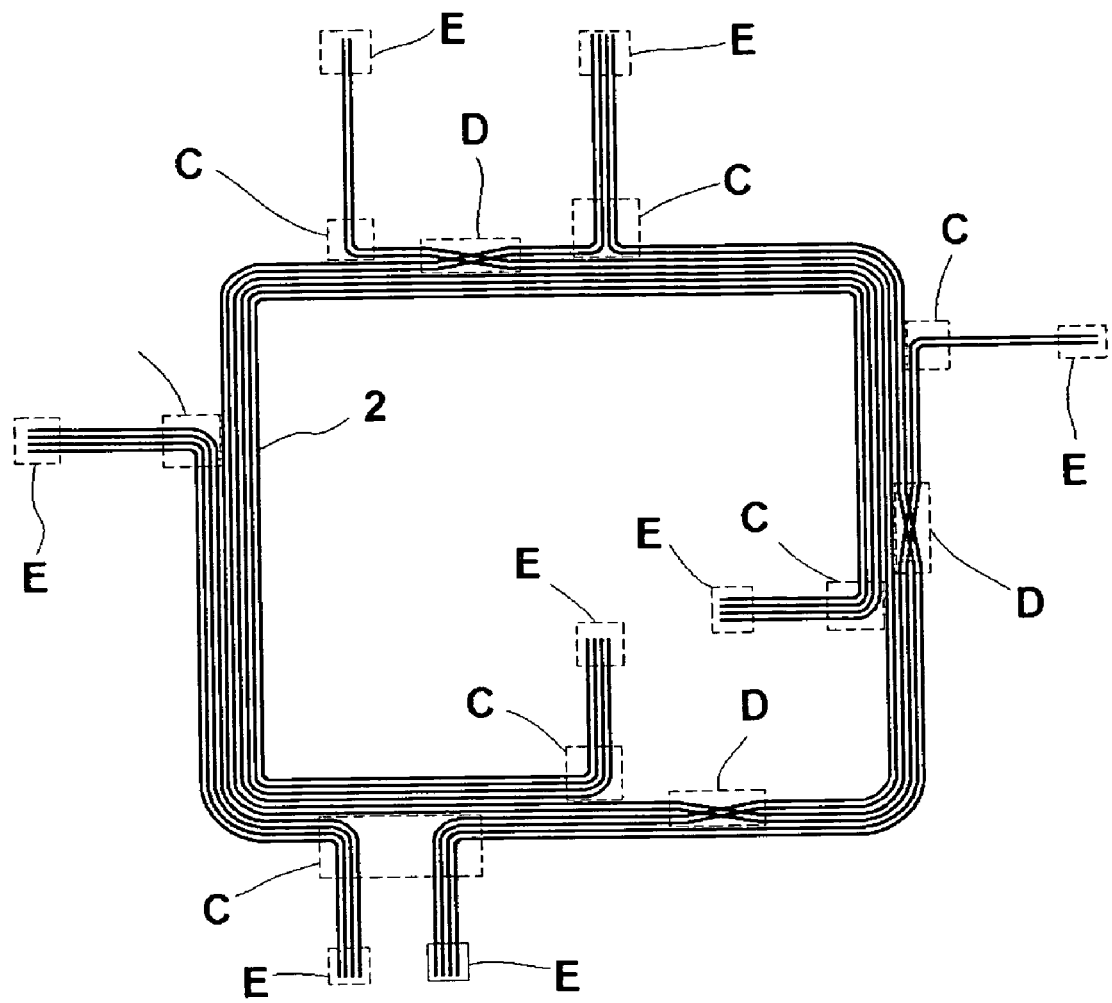
FIG. 6 is a diagram showing the wiring condition of coated optical fibers in one example of a looped optical fiber wiring sheet of the present invention.

In optical fiber wiring sheets according to an embodiment of the present invention, multiple coated optical fibers that have been aligned and wired may form a loop. FIG. 6 is a schematic diagram showing the wiring condition of one example of looped optical fiber wiring sheet according to an embodiment of the present invention. The optical fiber wiring sheet shown in FIG. 6 has multiple aligned coated optical fibers (2) being wired in loops, thus forming successive looped optical-fiber aligning sections. The optical-fiber branching parts (C), optical-fiber rearranging parts (D) and optical input/output ports (E) have the same structures shown in FIG. 5. Incidentally, a looped optical-fiber aligning section may have a part or parts, as deemed appropriate, for rearranging the coated optical fibers. In this particular embodiment, a desired number of coated optical fibers having desired arrangement orders may be set at desired positions to provide optical input/output ports on the outside and inside of the coated optical fiber loops.

In the optical fiber wiring sheets shown in FIGS. 5 and 6 above, the multiple coated optical fibers comprising the optical-fiber aligning sections, optical-fiber branching parts and optical-fiber rearranging parts need to be affixed just enough to retain these structures, and there are not specific affixing methods that must be used. For example, coated optical fibers may be affixed on a film substrate using adhesive or pressure-sensitive adhesive. When manufacturability, handling ease and reliability are considered, however, it is desirable that multiple coated optical fibers be integrally covered with a covering material.

Figure 7:
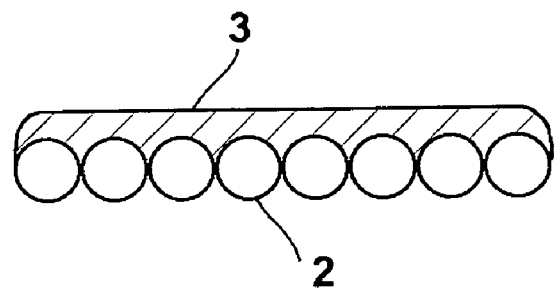
FIG. 7 is a cross-section view showing one example of an optical-fiber aligning section in an optical fiber wiring sheet of the present invention.

FIG. 7 is a cross-section view showing one example of optical fiber-aligning section in an optical fiber wiring sheet according to an embodiment of the present invention, where the optical fiber-aligning section is covered with a covering material. In FIG. 7, aligned multiple coated optical fibers (2) are affixed by means of a covering material (3) that covers the top of the coated optical fibers. Although FIG. 7 shows the covered condition of an optical-fiber aligning section, covering of optical-fiber rearranging parts and optical-fiber branching parts can also be implemented in the same manner as explained above in the example of an optical-fiber aligning section.

In optical fiber wiring sheets according to an embodiment of the present invention, the coated optical fibers branched at the optical-fiber branching part may form multiple optical-fiber aligning sections stacked on top of one another. If coated optical fibers branched at an optical-fiber branching part form multiple optical-fiber aligning sections stacked on top of one another, the alignment order of optical fibers is effectively changed at the optical-fiber branching part.

Figure 8A:
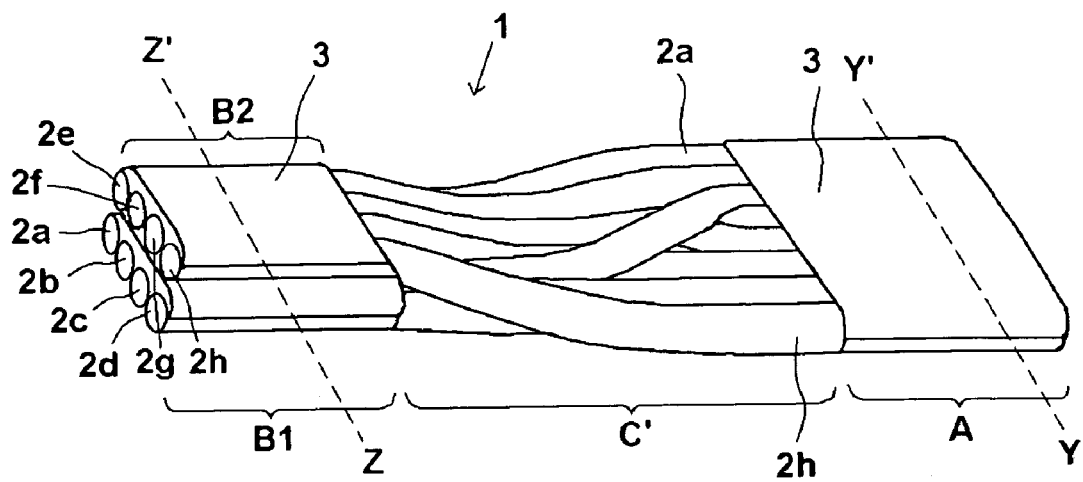
FIG. 8A is a perspective view showing one example of an optical fiber wiring sheet of the present invention.
Figure 8B:
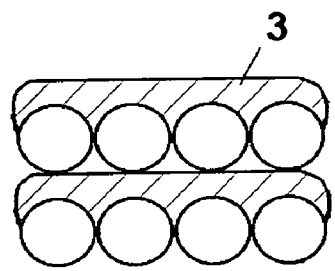
Figure 8C:
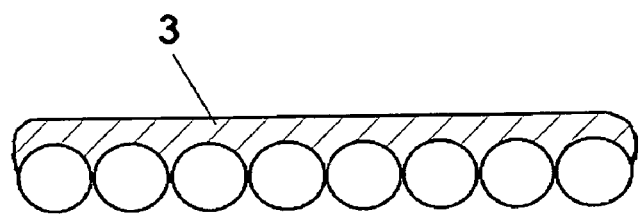
FIG. 8C is a cross-section view, taken along line Y–Y'.

FIG. 8A is a perspective view showing one example of optical fiber wiring sheet according to an embodiment of the present invention, where the optical fiber wiring sheet forms two optical-fiber aligning sections stacked on top of each another. The optical fiber wiring sheet in FIG. 8A comprises: a single-layer optical-fiber aligning section (A) in which coated optical fibers ($2a$ through $2h$) are aligned in a manner leaving no space in between; an optical-fiber branching section (C') from which bundles of coated optical fibers are branched vertically; an optical-fiber aligning section (B1) in which coated optical fibers ($2a$ through $2d$) are aligned in a manner leaving no space in between; and an optical-fiber aligning section (B2) in which coated optical fibers ($2e$ through $2h$) are aligned in a manner leaving no space in between; with the last two optical-fiber aligning sections stacked on top of each other. One side of all optical-fiber aligning sections (A, B1, B2) is covered with a covering material (3) to form a covering layer. FIG. 8B is a cross-section view of optical-fiber aligning sections (B1, B2) stacked on top of each other, taken along line Z–Z' of FIG. 8A, while FIG. 8C is a cross-section view of single-layer optical-fiber aligning section (A), taken along line Y–Y'. If multiple optical-fiber aligning sections are stacked on top of one another, as shown above, the arrangement order of individual optical fibers can be changed, as deemed appropriate, at the applicable optical-fiber branching section. In FIG. 8A, for example, the optical fibers ($2b$, $2c$) in the optical fiber aligning section (B1) may be swapped.

Figure 9:
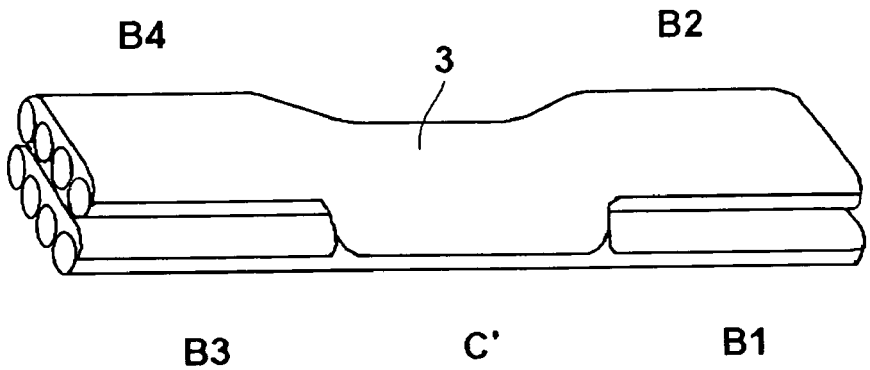
FIG. 9 is a perspective view showing one example of an optical fiber wiring sheet of the present invention.

Optical-fiber aligning sections stacked on top of one another may exist on both the input end side and output end side. For example, an optical fiber wiring sheet may have multiple sets of multiple optical-fiber aligning sections stacked on top of one another, as shown in FIG. 9. Specifically, this structure has a pair of optical-fiber aligning sections (B1, B2) and another pair of optical-fiber aligning sections (B3, B4), each stacked on top of each other on either side of an optical-fiber branching section (C'). In this case, the coated optical fibers are rearranged in the optical-fiber branching section (C').

Figure 10:
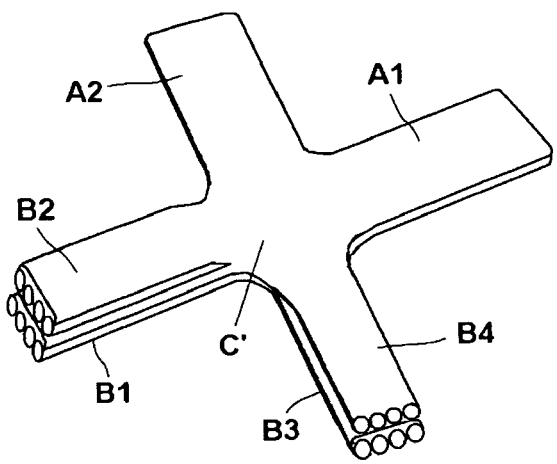
FIG. 10 is a perspective view showing one example of an optical fiber wiring sheet of the present invention.

FIG. 10 shows another example of optical fiber wiring sheet according to an embodiment of the present invention, where multiple optical-fiber aligning sections are formed on top of one another. In the structure shown in this figure, single-layer optical-fiber aligning sections (A1, A2) are rearranged at a branching section (C') and then rebranched to form two pairs of optical-fiber aligning sections (B1 and B2, B3 and B4) stacked on top of each other.

Coated optical fibers that can be used in an embodiment of the present invention are not limited in any way, and desired coated optical fibers can be selected, as deemed appropriate, according to the application, etc. For example, coated optical fibers made of quartz, plastic, etc., and processed into multi-core or single-core patterns can be used. The outer diameter and length of optical fibers are not limited in any way, either, and coated optical fibers can be cut to adjust the lengths of branched coated optical fibers. Coated optical fibers can also be straightened, partially reshaped or processed in any other way.

If, in an optical fiber wiring sheet according to an embodiment of the present invention, multiple coated optical fibers are to be covered with a covering material for the purpose of maintaining the relative positions of coated optical fibers, it is desirable that covering be provided only on one side of the bundle of coated optical fibers. If a covering layer is provided only on one side of the bundle of coated optical fibers, flexing of coated optical fibers generates less stain in the covering material than when both sides are covered. Since the covering material bends in compliance with the coated optical fibers, the optical fiber wiring sheet provides good flexibility and easy handling.

In an embodiment of the present invention, the covering material used to cover bundles of coated optical fibers is not specifically limited. If optical-fiber branching parts are to be formed after formation of covering layer, however, it is ideal that the covering material allows easy tearing by means of grabbing and pulling the ends of coated optical fibers. Also, preferably the tear strength of a formed single covering layer should be 29 kgf/cm or less. If the tear strength exceeds 29 kgf/cm, an excessive tear resistance reduces workability. Because a large load must be applied to tear the coated optical fibers, the covering material may crack or chip, as well. A more preferable range of tear strength is 10 kgf/cm or less. Tear strength should be measured by conducting tests in conformance with JIS K6250 (General Physical Test Methods for Vulcanized and Thermoplastic Rubbers) and JIS K6252 (Tear Test Method for Vulcanized Rubbers). Specifically, a notched, angular test piece of sheet shape is prepared, and the test piece is pulled to measure the stress at which the tear expands. The maximum tearing force measured this way should be used as the above tear strength.

The covering material used in an embodiment of the present invention should ideally be able to bond favorably with the outermost covering material of coated optical fibers. In addition, the material should desirably have good flexibility to increase the handling ease of the optical fiber wiring sheet. One material that satisfies the above conditions is silicone rubber. Silicone rubber has a small intermolecular force of Si—O bond. As a result, it has small tear strength and the ends can be torn easily. On the other hand, silicon rubber is elastic and thus offers excellent flexibility. It also has good elongation and tensile strength, thereby offering high compliance with respect to the movements of bonded optical fibers as they move, while also exhibiting strong resistance to tearing at intermediate positions. In other words, silicone rubber not only allows easy branching of ends in the production of optical fiber wiring sheets, but it also adds strong tear resistance to the finished optical fiber wiring sheets with affixed ends during actual use. In general, materials having Si—O bond offer excellent heat resistance. Silicone rubber, being a Si—O bond material, also offers excellent retention of heat resistance and exhibits excellent adhesive strength in high-and low-temperature environments. For this reason, wiring members made of silicone rubber do not degrade in a high-temperature environment (up to 250° C.) or low-temperature environment (down to −50° C.) and are able to keep optical fibers in a properly affixed condition. Silicone rubber also provides excellent electrical insulation, chemical resistance, weather resistance and water resistance. If primer is used as necessary, silicone rubber can be bonded with a wide range of materials. For example, silicone rubber can be adhered to plastic fibers made of fluorine resins, or fibers having claddings coated with fluorine resin. Among various types of silicone rubber, room-temperature vulcanizing (RTV) silicone rubber is desirable, because it cures in room temperature and thus can be used conveniently. In view of minimal generation of byproducts and good workability, silicon rubber of additional-reaction setting type, condensation-reaction setting type, or single-component type (all necessary components are provided in a single sealed container of tube or cartridge type), is particularly favorable.

In the aforementioned optical fiber wiring sheets according to an embodiment of the present invention, an optical-fiber branching section should ideally be affixed with a protective member. By affixing with a protective member, an optical-fiber branching section can be regulated not to split more than necessary.

Figure 11:
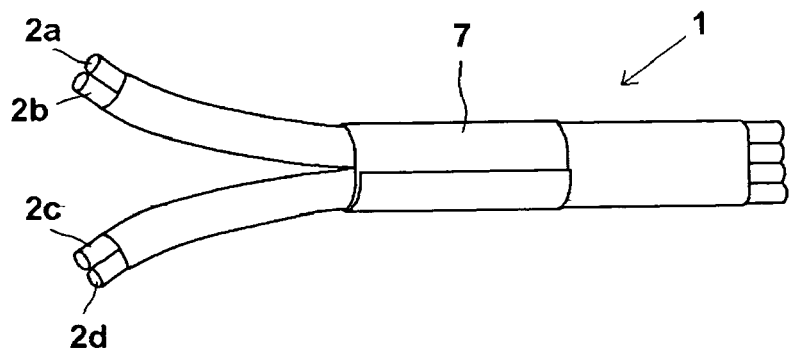
FIG. 11 is a perspective view showing one example of an optical fiber wiring sheet of the present invention.
Figure 12:
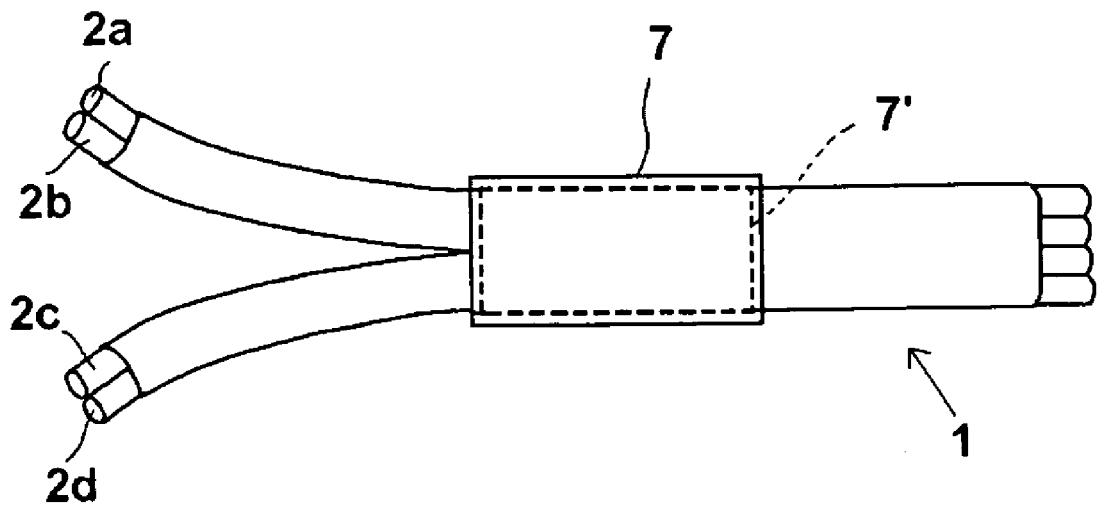
FIG. 12 is a perspective view showing one example of an optical fiber wiring sheet of the present invention.
Figure 13:
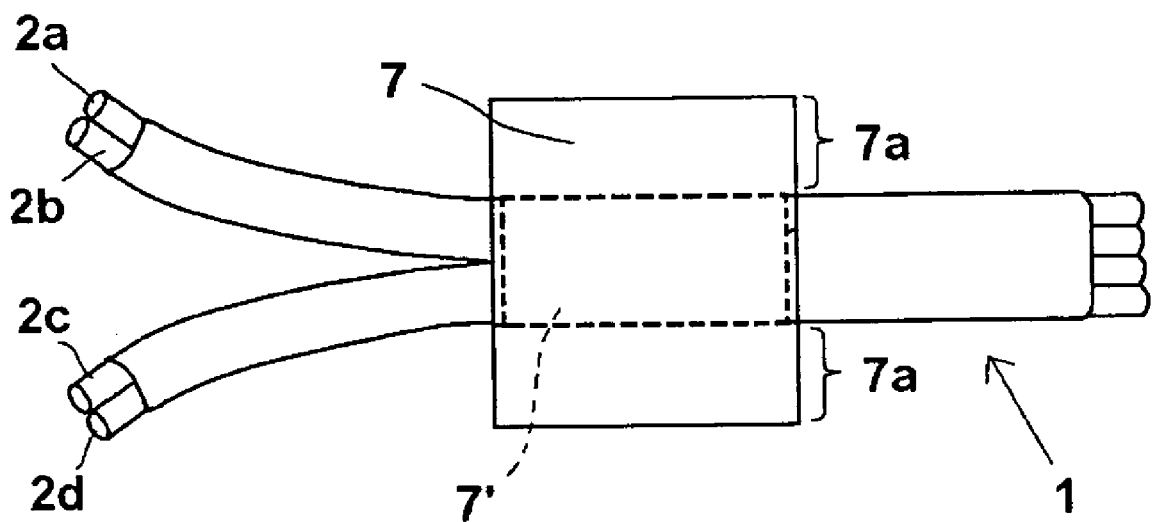
FIG. 13 is a perspective view showing one example of an optical fiber wiring sheet of the present invention.

FIGS. 11 through 15 show examples of affixing, with a protective material, the optical-fiber branching section of the optical fiber wiring sheet shown in FIG. 1. For example, the optical-fiber branching section can be affixed by encasing the section in a single sheet with adhesive layer (7), as shown in FIG. 11. The optical-fiber branching section can also be affixed by bonding between two sheets with adhesive layer (7, 7'), as shown in FIG. 12. If two sheets with adhesive layer are used, one of the sheets may have a larger size, as shown in FIG. 13. In this case, the excess sheet areas (7a) of the larger sheet that are not attached to the other sheet can be attached to the mating device while holding the coated optical fibers underneath. This way, the optical-fiber branching section can be securely positioned in the device. It is desirable that a release film coated with parting agent be attached to the adhesive layer in the excess sheet areas (7a) before installation.

Figure 14A:
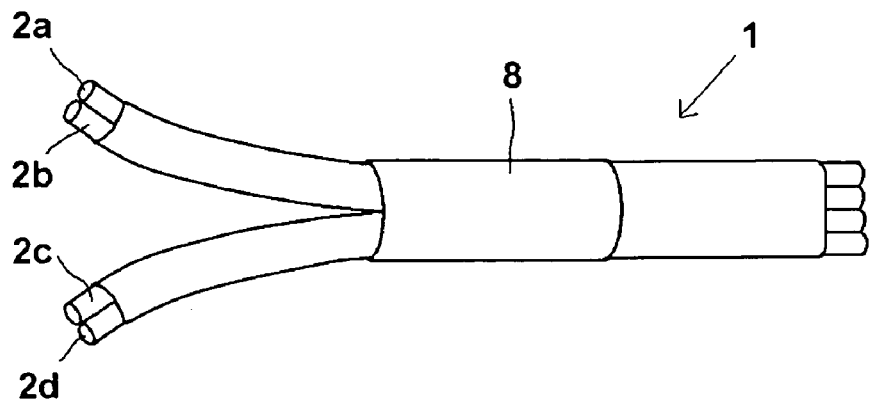
Figure 14B:
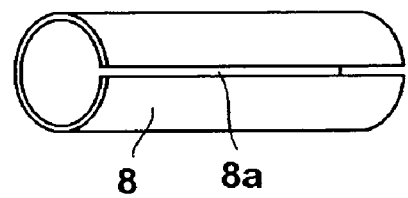
FIG. 14B is a perspective view of a tube member.

As shown in FIG. 14A, the covering material can be torn to a desired position to branch the optical-fiber branching section into one bundle consisting of coated optical fibers (2a, 2b) and the other bundle consisting of coated optical fibers (2c, 2d), after which the optical fibers can be stored in the hollow space inside a tube member (8) to affix the optical-fiber branching section. The tube member can have any shape, as long as it does not break due to contact with the optical fibers or other components. For example, the tube member can have a circular shape or oval shape. As shown in FIG. 14B, the tube member (8) may have a slit (8a) to facilitate insertion of optical fibers into the hollow space. Ideal materials of this tube member include plastics, metals and rubbers. The lighter material is preferable. A rubber tube member can affix an optical-fiber branching section by means of a shrinking force generated by the elasticity of rubber. A plastic shrinkable tube member can affix an optical-fiber branching section once the tube is shrunk by means of heat, ultraviolet light, heating wire, etc. When convenience and yield are considered, however, tube members should preferably be heat-shrinkable ones that can be easily shrunk with a heater to affix optical-fiber branching sections. The shape of this shrinkable tube member is not specifically limited, and the tube may have a circular, oval or square cross-section according to the specification. It is also possible to insert a rigid support member into a shrinkable tube member to prevent deformation of an optical-fiber rearranging section. To improve workability, a shrinkable tube member may be notched or processed in other ways. An optical-fiber protection sleeve is an example of protective member using a resin shrinkable tube member.

Figure 15:
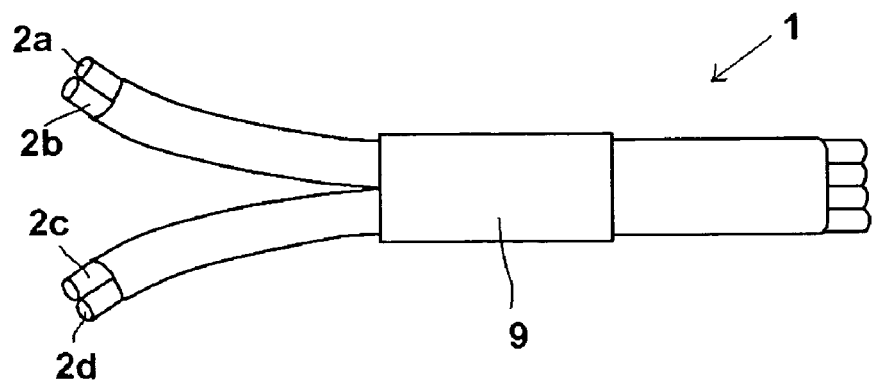
FIG. 15 is a perspective view showing one example of an optical fiber wiring sheet of the present invention.

As shown in FIG. 15, an optical-fiber branching section may be affixed using resin (9). Since resin can be molded into a desired shape, an appropriate covering shape can be designed according to the specification to increase production efficiency. It is also possible to apply resin over the single covering layer that is covering unbranched coated optical fibers, and then branch the optical fibers. This way, branching of optical fibers can be stopped at the position where the resin cover starts.

The resin for affixing optical-fiber branching sections is not specifically limited, and any resin can be used as long as its tear strength is higher than that of the covering material of coated optical fibers. Among others, rubber resin materials, thermoplastic resins, and setting resins such as thermosetting resins, UV setting resins and electron-beam setting resins can be used. More specifically, candidate rubber resin materials include silicone rubber, urethane rubber, fluorine rubber, acrylic rubber, ethylene-acrylic rubber and chloroprene rubber. Also, these resins should desirably offer flexibility to improve handling ease of the optical fiber wiring sheet. Flexible setting resins include epoxy resins, UV setting adhesives and silicone resins. As for thermoplastic resins, any resins can be used as long as they provide flexibility. For example, resins comprising hot-melt adhesives, such as polyvinyl acetate and polyethylene methacrylate can be used. In particular, hot-melt adhesives can be used favorably in an embodiment of the present invention, because they do not become sticky in room temperature, are pollution-free and non-toxic, and present no fire hazards.

Figure 16:
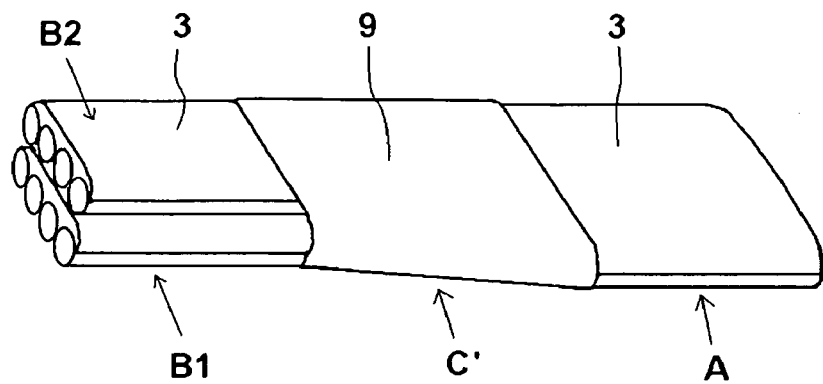
FIG. 16 is a perspective view showing one example of an optical fiber wiring sheet of the present invention.
Figure 17:
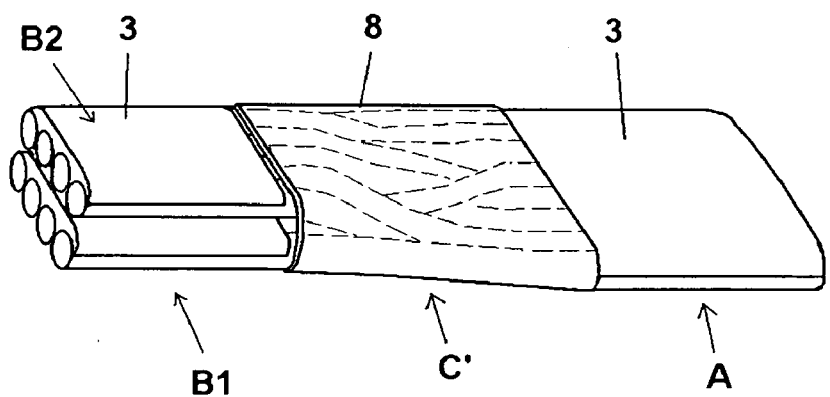
FIG. 17 is a perspective view showing one example of an optical fiber wiring sheet of the present invention.

FIGS. 16 and 17 show examples of affixing, with a protective material, the optical-fiber branching section of the optical fiber wiring sheet shown in FIG. 8. In FIG. 16, resin (9) is applied to the optical-fiber branching section (C') as a protective material. Although any of the aforementioned resins can be used, the same resin applied as the covering material (3) on the optical-fiber aligning sections (A, B1, B2) can also be used. The covering material (3) layer may exist underneath the resin (9).

FIG. 17 is a perspective view showing an optical-fiber branching section affixed with a shrinkable tube. In the figure, numeral 8 represents a shrinkable tube. The coated optical fibers in an optical-fiber aligning section (A) are covered with a covering material (3), and then the rearranged coated optical fibers in an optical-fiber branching section (C') are inserted into the shrinkable tube (8), after which the shrinkable tube is caused to shrink. In this case, the coated optical fibers in the optical-fiber branching section can be affixed without covering them with a covering material, which reduces the process time.

The aforementioned tube member and resin should ideally be clear or opaque to enable visual check. Clear or opaque materials allow the branching condition of optical fibers to be checked externally to determine whether or not the branching is acceptable. This improves reliability.

Figure 18:
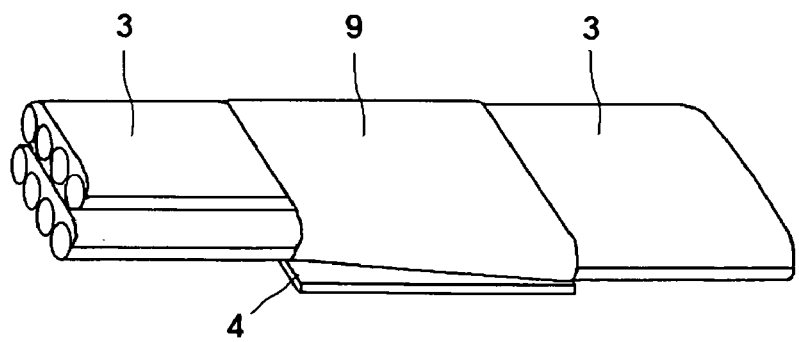
FIG. 18 is a perspective view showing one example of an optical fiber wiring sheet of the present invention.

In optical fiber wiring sheets according to an embodiment of the present invention, coated optical fibers can be affixed to a substrate at optical-fiber branching sections. FIG. 18 is a perspective view showing one example of this structure. In FIG. 18, coated optical fibers to be branched are wired on a substrate (4) coated with adhesive. Affixing resin (9) is then applied over the branching section to protect the coated optical fibers at the optical-fiber branching section. Since the coated optical fibers are affixed to the substrate, kinking or bending due to opening of coated optical fibers does not occur, and there is no optical loss due to micro-bends, either. As a result, coated optical fibers will remain properly wired at intersecting points for a long period. In the above example, the coated optical fibers at the optical-fiber branching section can be inserted, together with the substrate, into a shrinkable tube and then the shrinkable tube is shrunk to affix the coated optical fibers and substrate.

In optical fiber wiring sheets according to an embodiment of the present invention, it is desirable that optical-fiber aligning sections and/or optical-fiber branching sections provide identification markings to identify how the aforementioned coated optical fibers are rearranged. Specific patterns in which this rearranging identification function can be embodied are described below. It should be noted, however, that rearranging identification markings are not limited to the patterns explained below. As a way to provide identification markings for rearranged coated optical fibers and their directions, the color marker method can be employed. The numbers of colors and markers used vary depending on the number of rearranged cores to be identified. For example, 25 different combinations can be identified using five colors and two markers. Color markers can be provided by means of applying color paint to the end of each fiber aligning section or fiber branching section. To identify how coated optical fibers are rearranged, it is also possible to attach separately on the input side and output side, two sets of color markers that record wiring-order information applicable to the input side and output side, respectively.

Figure 19:
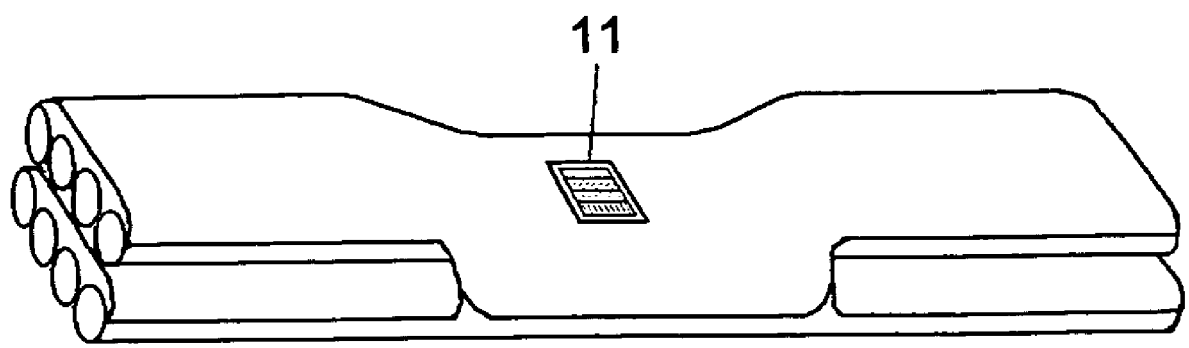
FIG. 19 is a perspective view showing one example of an optical fiber wiring sheet of the present invention.

As a method not requiring paint application, identification color plates made of PET sheet, etc., can be used. Under this method, color plates should be affixed on the covering material over optical-fiber aligning sections and/or optical-fiber branching sections using adhesive. FIG. 19 shows one example of how this identification method can be implemented. Here, a color plate (11) is affixed on an optical-fiber branching section using adhesive. Alternatively, color plates can be placed on an uncured covering material, and then the covering material is cured to affix the color plates on the covering material. It is also possible to affix color plates inside a shrinkable tube that is used as a protective member to protect an optical-fiber branching section. By providing pre-fabricated identification color plates as explained above, the production process of optical fiber wiring sheets can be simplified and the drop in yield due to contamination by paint can be prevented.

As a method not requiring color markers, an identification barcode that stores rearranging information of coated optical fibers, or a RFID (Radio Frequency Identification) tag that stores identification information, can also be used. These barcodes and tags can be affixed to optical fiber wiring sheets according to an embodiment of the present invention, using the same method as employed for color plates above. Identification information is read optically or via wireless communication. By providing the aforementioned identification markings and thereby adding a rearranging identification function, mistaken use by operators of wrong optical fiber wiring sheets having different rearranging patterns can be prevented. As miswiring is prevented, work efficiency improves further.

Figure 20:
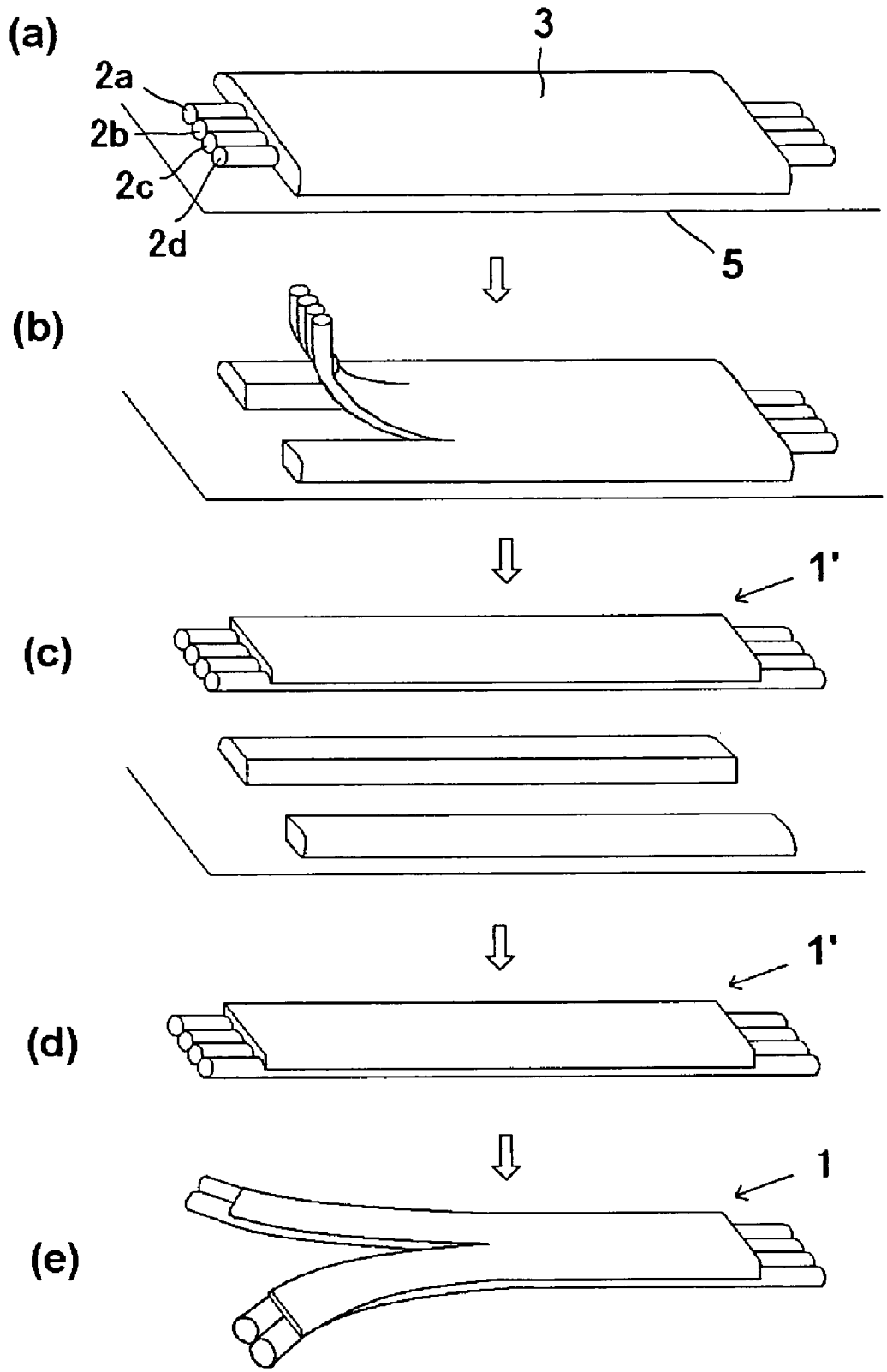
FIG. 20 is a process diagram explaining one example of a method of producing an optical fiber wiring sheet of the present invention.

The aforementioned optical fiber wiring sheets according to an embodiment of the present invention can be produced in any method. For example, the optical fiber wiring sheet shown in FIG. 1 can be produced using the method illustrated in FIG. 20. First, in a preparation step, four coated optical fibers (2a through 2d) are aligned and placed in parallel on a substrate with two-dimensional plane (5). Next, in a covering step, a covering material (3) is applied over the multiple coated optical fibers to cover a desired range of the optical fibers, and then the covering material is cured (FIG. 20 (a)). Thereafter, the optical fibers (2a through 2d) are peeled from the substrate with two-dimensional plane (5) in such a way that the optical fibers remain aligned (FIG. 20 (b)), in order to produce an optical fiber wiring sheet (1') to be branched (FIG. 20 (c), (d)). Next, in a branching step, the ends of coated optical fibers (2a, 2b) and ends of coated optical fibers (2c, 2d), of the obtained optical fiber wiring sheet (1'), are held, and then the two sets of coated optical fibers are caused to move relatively to tear the covering layer between coated optical fibers (2a, 2b) and coated optical fibers (2c, 2d) to obtain a branched optical fiber wiring sheet (1) (FIG. 20 (e)).

In the production method according to an embodiment of the present invention, the covering step in which a single covering layer is formed over multiple coated optical fibers via simultaneously covering of the coated optical fibers with a covering material, need only to form a covering material layer of a desired thickness over the surface of coated optical fibers, and the covering method and forming method are not limited in any way. For example, a forming jig can be moved from the starting position of forming to end position of forming to produce, by means of the bottom of the forming jig, a covering material layer of constant thickness over the surface of coated optical fibers.

In the branching step in which multiple coated optical fibers are branched, the angle and speed at which the optical fibers are moved relatively to tear the covering material are not specifically limited, and can be set freely as deemed appropriate. For example, this relative movement may be one in which the coated optical fibers move away from each other horizontally, or one in which they move away from each other vertically.

According to the aforementioned production method, only the top of the bundle of coated optical fibers is covered with the covering material, and thus the optical fibers can be easily branched. By providing a covering layer only on one side of the bundle of coated optical fibers, flexing of optical fibers does not generate much strain between the covering material and optical fibers, thereby ensuring good flexibility and handling ease.

An optical fiber wiring sheet having an optical-fiber rearranging part in its optical-fiber aligning section can be produced in the following way, for example. First, a specified number of coated optical fibers needed to produce the target optical fiber wiring sheet are aligned in a desired pattern on a two-dimensional plane. The required number of coated optical fibers can be determined from a preliminary design of optical fiber wiring sheet. Thereafter, the arrangement of the coated optical fibers is changed at an optical-fiber aligning section, after which the optical fibers are branched. At this time, the coated optical fibers are realigned or their lengths adjusted, if necessary. Next, a covering material is applied over the top surface of the coated optical fibers aligned and placed in a desired pattern on a two-dimensional plane, after which the covering material is cured to produce an optical fiber wiring sheet. This production method only involves alignment and rearranging of coated optical fibers, followed by application of a covering material over the top surface of rearranged coated optical fibers. This way, an optical fiber wiring sheet can be produced in a simple manner without splitting and reattaching an optical fiber wiring sheet.

Figure 21:
FIG. 21 is a process diagram explaining one example of a method of producing an optical fiber wiring sheet of the present invention.
Figure 21:
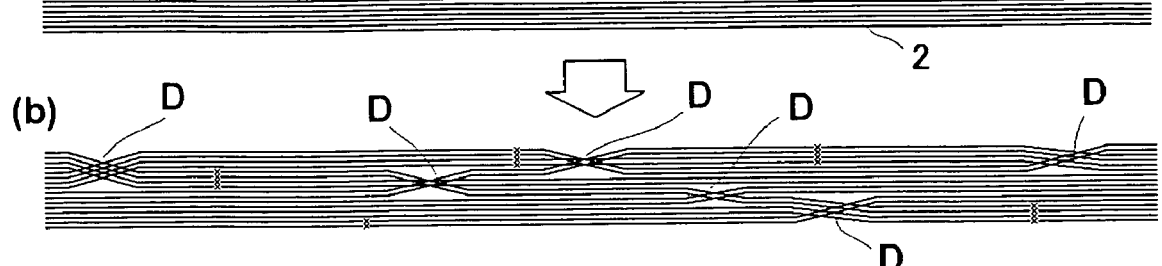
Figure 21:
Figure 21:
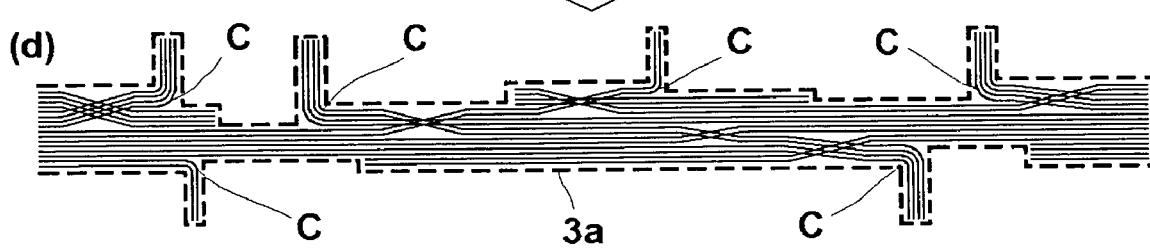

If the covering material offers good tear strength, as is the case with silicone resin, the covering material can be applied over the coated optical fibers after they have been aligned and rearranged to form an optical-fiber rearranging part, and then the covering layer is torn as the last step to form an optical-fiber branching part. FIG. 21 is a process diagram illustrating one example of this method. First, a desired number of coated optical fibers (2) are aligned and arranged in parallel on a two-dimensional plane (refer to FIG. 21 (a)). Next, the parallel coated optical fibers are rearranged to form fiber rearranging parts (D), with the intention of branching desired numbers of coated optical fibers at desired positions from the outside, while the coated optical fibers are also cut at the necessary positions based on the necessary lengths of coated optical fibers required for branching (see FIG. 21 (b); the cutting positions of coated optical fibers are indicated by x in the figure). Next, the optical fiber wiring sheet produced in FIG. 21 (b) is covered with silicone rubber (3a) to form a covering layer (see FIG. 21 (c); the thick broken lines in the figure schematically indicate the covered range). Lastly, the silicone-rubber covering layer of the optical fiber wiring sheet is broken at desired positions to form branching parts (C) covered with silicone rubber (3a). Hence, a final optical fiber wiring sheet has been produced (refer to FIG. 21 (d)).

The following describes an example of how an optical fiber wiring sheet having multiple optical-fiber aligning sections stacked on top of one another, like the one shown in FIG. 8, can be produced. First, in a preliminary covering step, multiple coated optical fibers are placed/aligned on a two-dimensional plane. Thereafter, multiple structures are produced, each having coated optical fibers with the parts to be stacked covered with a covering material. Next, in a rearranging and branching step, the pre-covered parts of the obtained multiple structures (two structures are shown in FIG. 8) are stacked on top of one another, after which the alignment order of multiple coated optical fibers is changed to form an optical-fiber branching section. Next, in a covering step, the uncovered parts of the multiple coated optical fibers are aligned in parallel on a two-dimensional plane, and the specified parts are covered with a covering material to form a covering layer and thereby produce an optical fiber wiring sheet.

EFFECT OF THE INVENTION

Optical fiber wiring sheets with a branching structure, as according to an embodiment of the present invention, can be placed in desired patterns inside or on top of optical circuit devices. Since optical fiber wiring sheets having optical-fiber aligning sections, optical-fiber rearranging parts and/or optical-fiber branching parts can form input/output ends in desired positions using desired numbers of coated optical fibers having desired arrangement orders, connection patterns can be simplified and congestion of coated optical fibers in optical circuit devices can be prevented. Here, optical circuit devices include, for example, substrates, devices and installations to accommodate connection points for interconnecting coated optical fibers or connecting optical elements, optical modules and coated optical fibers, such as substrates, optical fiber distribution frames, optical fiber terminal boxes, optical panels, optical closures and optical cabinets installing optical components.

The present invention can also encompass optical circuit devices in which the coated optical fibers are connected to optical components at input/output ports of optical fiber wiring sheets according to an embodiment of the present invention. As long as they enclose the coated optical fibers connected to optical components at the optical input/output ports of optical fiber wiring sheets, these optical circuit devices can be of any types such as those commonly known as substrates, optical fiber distribution frames, optical fiber terminal boxes, optical panels, optical closures and optical cabinets. Optical components are not specifically limited, and may include passive optical components such as lenses and filters, active optical components such as photo detectors, light-emitting devices and optical switches, and optical waveguides. Connections between the coated optical fibers and optical components can be implemented by fusing or via optical connectors such as FC, SC and MU optical connectors.

Among all optical fiber wiring sheets according to an embodiment of the present invention, those having optical-fiber aligning sections, optical-fiber branching parts and optical-fiber rearranging parts, such as the one shown in FIG. 5 above, can form optical input/output ports on both sides of the optical fiber wiring sheet or at other desired positions on the optical fiber wiring sheet, if the optical fiber wiring sheet has a long shape. With looped optical fiber wiring sheets, optical input/output ports can be formed at desired positions on the inside and outside of the loop. These input/output ports can be connected, in an easy and space-saving manner, with desired input/output ports provided on optical circuit devices and optical-circuit storage devices.

Up to now, optical fiber wiring inside optical circuit devices and optical-circuit storage devices often became complex and congested because a large number of optical patch cables and/or optical fiber fan-out cables had to be provided according to the positions and number of ports. This complexity and congestion required on-site wiring, which hindered effective installation and maintenance/inspection. On the other hand, optical fiber wiring sheets according to an embodiment of the present invention allow optical fiber wiring in an easy and space-saving manner, even inside devices having many ports, because desired numbers of coated optical fibers of desired arrangements can be taken out at desired positions for connection with input/output ports.

Also, in an embodiment, the present invention allows optical fiber wiring in an optical circuit device or optical-circuit storage device to be pre-designed and stored in a single component, thereby reducing the need to carry out complex wiring on site. In addition, optical fiber wiring sheets according to an embodiment of the present invention can be installed in optical circuit devices and optical-circuit storage devices. Furthermore, when multiple optical fiber wiring sheets are arranged in such a way to wire coated optical fibers in loop, optical circuit devices and optical-circuit storage devices free from congestion of coated optical fibers can be embodied.

Among all optical fiber wiring sheets according to an embodiment of the present invention, those having multiple optical-fiber aligning sections stacked on top of one another, like the one shown in FIG. 8 above, can be selectively used based on proper wiring of coated optical fibers according to the input/output ports of the target device. This way, there is no need, unlike with conventional optical fiber tape cores, to split coated optical fibers one by one to rearrange them according to the input/output ports of the target device. Also, these optical fiber wiring sheets have coated optical fibers aligned and affixed in a manner leaving no space in between, at their single-layer optical-fiber aligning sections or multiple optical-fiber aligning sections stacked on top of one another and having the width equivalent to conventional optical fiber tapes. This enables wiring with space efficiency equivalent to conventional optical fiber tapes.

EXAMPLES

The present invention is explained below using examples. It should be noted, however, that the present invention is not limited to these examples.

Example 1

Figure 22:
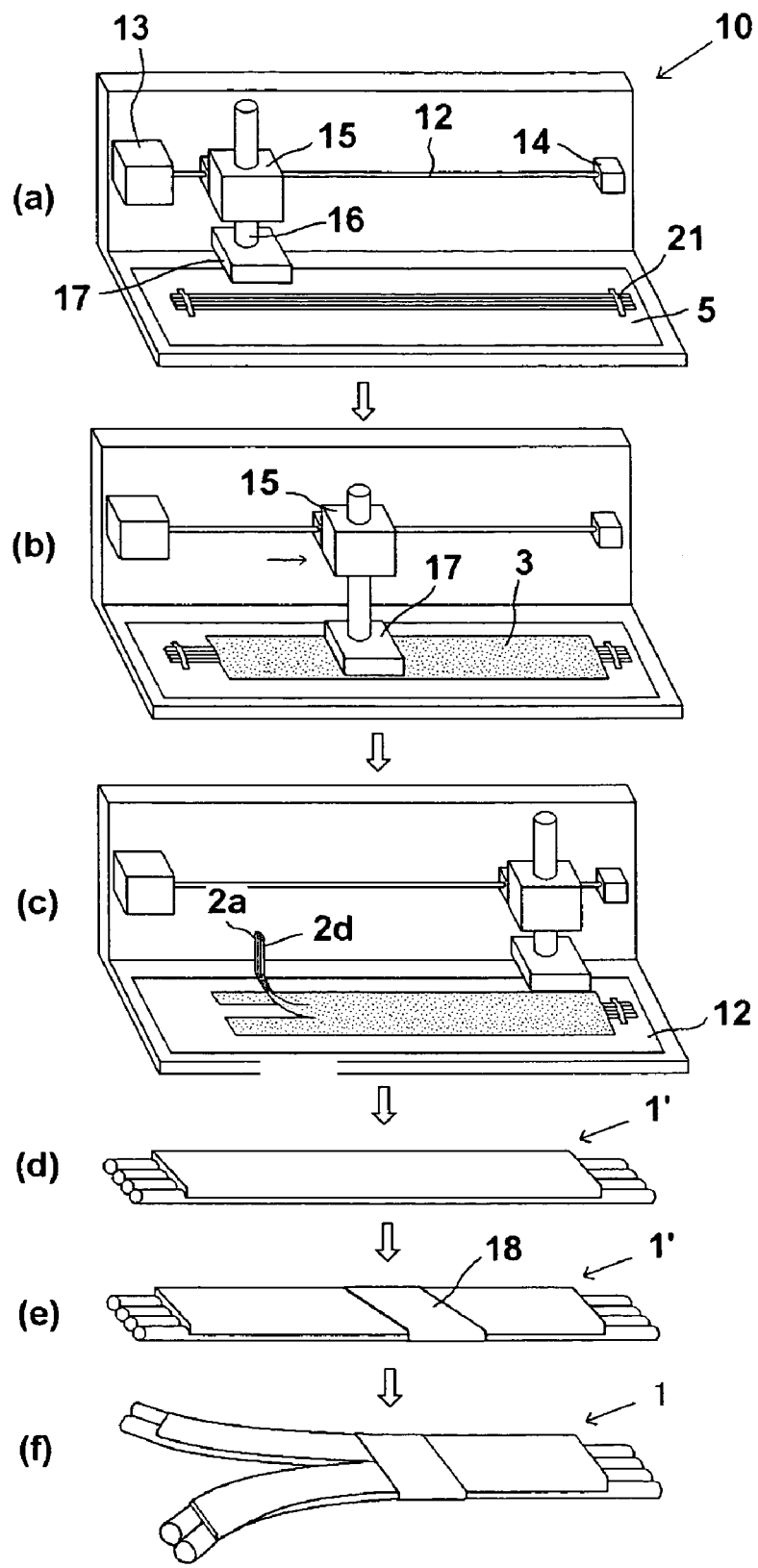
FIG. 22 is a process diagram explaining a method of producing an optical fiber wiring sheet in Example 1.

An optical fiber wiring sheet with a branching structure was produced according to the process illustrated in FIG. 22. This application apparatus comprised a single-axis control robot (10) and a material feeding apparatus (not shown). The single-axis control robot had a substrate with two-dimensional plane (5) on which to place coated optical fibers. It also had a ball-screw shaft (12) extending in the longitudinal direction, with a drive motor (13) provided on one end of the ball-screw shaft, while the other end was supported by a bearing (14). This ball screw engaged with a movable unit (15) by means of threads, and on this movable unit a needle (16) vertically movable to supply material was installed perpendicular to the stage surface. The needle was connected to the material feeding apparatus via a flexible rubber tube (not shown). The tip of the needle (16) had a flat bottom, where a forming jig (17) of 40 mm in width, 30 mm in length and 40 mm in height could be attached.

Four 40-cm long coated optical fibers (2a through 2d) (product name: Quartz Single-mode Fiber, outer diameter 0.25 mm; manufactured by Furukawa Electric) were aligned in parallel on a substrate with two-dimensional plane (5), and the non-covered parts on both ends were affixed using adhesive tape (21) to apply a constant tension on the coated optical fibers (2a through 2d) (FIG. 22 (a)). Next, the aforementioned application apparatus was used to apply room-temperature vulcanizing silicone rubber resin (product name: TSE392, tear strength 5 kgf/cm; manufactured by Toshiba Silicone) to the four coated optical fibers over the range to be covered (30 cm).

Next, the forming jig (17) was arranged so that the distance between the bottom of the forming jig and the surface of four coated optical fibers became 0.1 mm, and the forming jig was moved in the axial direction of coated optical fibers (2a through 2d) at a speed of 50 mm/sec to form a covering material (3) (FIG. 22 (b)). Next, the formed covering material (3) was half cured in room temperature over a curing time of 30 minutes. Thereafter, one side of the coated optical fibers (2a through 2d) was held and then pulled upward (FIG. 22 (c)) to separate from the substrate with two-dimensional plane (5) the coated optical fibers (2a through 2d) covered with the covering material. Thereafter, the assembly was held still for one hour in room temperature to completely cure the covering material (3) to obtain a four-core optical fiber wiring sheet (1') (FIG. 22 (d)).

Next, the part of the obtained optical fiber wiring sheet (1') to become an optical-fiber branching section was inserted into a silicone rubber shrinkable tube offering heat-shrinkability (18) (product name: Sparon, inner diameter 1.5 mm; manufactured by Nikkan Industries), and then the tube was shrunk via heating for 5 minutes using a heater (FIG. 22 (e)). Next, the ends of two coated optical fibers of the optical fiber wiring sheet (1') were held separately from the ends of remaining two coated optical fibers, and the two sets of coated optical fibers were moved relatively from the center in the axial direction of optical fibers to tear the covering material up to the end of the shrinkable tube (18). This produced a fan-out optical fiber wiring sheet with a covering layer thickness of 0.4 mm and width of 1.1 mm, with the section 10 cm from the covering layer end branching into two bundles consisting of two coated optical fibers each (FIG. 22 (*f*)).

According to the fan-out optical fiber wiring sheet obtained in Example 1, the optical fibers could be branched only by holding separate bundles of optical fibers and then moving them relatively in the axial direction to tear. Since this production method did not require cutting tools or separation tools, production equipment costs decreased while safety was enhanced. Also, by using an optical fiber wiring sheet comprising optical fibers covered only on one side with a single covering layer, the optical fibers could be branched easily up to the specified position. Since broken fragments did not generate when the covering material was torn along the optical fibers, the surrounding environment was not contaminated. Also, no cutting or other post-processing was needed after branching.

Example 2

Eight 30-cm long coated optical fibers were aligned, and a covering material was applied to the coated optical fibers using the application apparatus in the same manner as in Example 1. The obtained assembly was held still for one hour in room temperature to cure the covering material to obtain a covering layer. Next, a 2-cm strip at the center of the optical fiber wiring sheet was covered with UV setting resin to a thickness of 2 mm, after which the UV setting resin was irradiated by a UV lamp for 2 minutes at an irradiation intensity of 20 mW/cm$^2$ to cure the resin. Thereafter, the optical fibers were separated from the substrate, a covering material was formed, and then the covering material was completely cured in room temperature. Furthermore, clear resin was applied to the center part as a protective member (6) to form a covering layer, as shown in FIG. 3. Thereafter, the ends of four bundles each consisting of two coated optical fibers were held separately on one end of the optical fiber wiring sheet, and moved relatively in the axial direction of optical fiber cables to tear the covering layer four ways up to the position of cured UV setting resin. The ends of two bundles each consisting of four coated optical fibers were held separately on the other end of the optical fiber wiring sheet, and moved relatively in the axial direction of optical fiber cables to tear the covering layer two ways up to the position of cured UV setting resin. This produced a fan-out optical fiber wiring sheet branching four ways and two ways on both sides of the center part, respectively.

Example 3

Eight 50-cm long coated optical fibers were aligned, and a covering material was applied to the entire coated optical fibers in the same manner as in Example 1 to form a covering layer. Next, a heat-shrinkable tube with slit (length: 2 cm) was placed, as a protective member (6), at the branching position of the coated optical fibers, and then the tube was shrunk using a heater. Thereafter, the coated optical fibers were branched into four bundles of two coated optical fibers each at intervals of 5 cm. This produced a fan-out optical fiber wiring sheet with its eight cores branching in sets of two cores at constant intervals, as shown in FIG. 4.

Example 4

An optical fiber wiring sheet having the wiring structure schematically illustrated in FIG. 5 (length: 30 cm) (hereinafter referred to as "unit structure F") and also having a wiring structure corresponding to unit structure F reversed in the longitudinal direction (hereinafter referred to as "unit structure F'"), with the two structures occurring successively on a two-dimensional plane in the sequence of F–F''–F–F''–F, was prepared. The length from a branching point on each optical-fiber branching part to an input/output end on each optical input/output port was adjusted to 20 cm. Quartz Single-mode Fiber manufactured by Sumitomo Electric Industries (outer diameter: 0.25 mm) was used for the coated optical fibers. As a covering material, thermosetting silicone rubber (KE1800; manufactured by Shin-Etsu Chemical) was applied over the aforementioned optical fiber wiring sheet to produce a final optical fiber wiring sheet. Curing was carried out with a dryer by heating for one hour at 120° C. The silicone-rubber covering layer had a thickness of 0.4 mm, while the optical-fiber rearranging part had a thickness of 0.8 mm.

The optical fiber wiring sheet produced in this example offered excellent flexibility because of the silicone rubber used as the covering material over the optical-fiber aligning section. This resulted in good workability since the optical fiber wiring sheet could be bent flexibly during handling.

Example 5

Coated optical fibers were placed on a two-dimensional plane in such a way that the wiring structure schematically illustrated in FIG. 6 (length of each side of the loop: 20 cm) was formed. The coated optical fibers were covered using the same covering material applied in Example 4. The length from a branching part of coated optical fibers to an input/output end was adjusted to 20 cm. Except for these differences, an optical fiber wiring sheet was produced in the same manner as in Example 4.

The optical fiber wiring sheet produced in this example offered excellent flexibility because of the silicone rubber used as the covering material over the optical-fiber aligning section. This resulted in good workability since the optical fiber wiring sheet could be bent flexibly during handling.

Example 6

Figure 23:
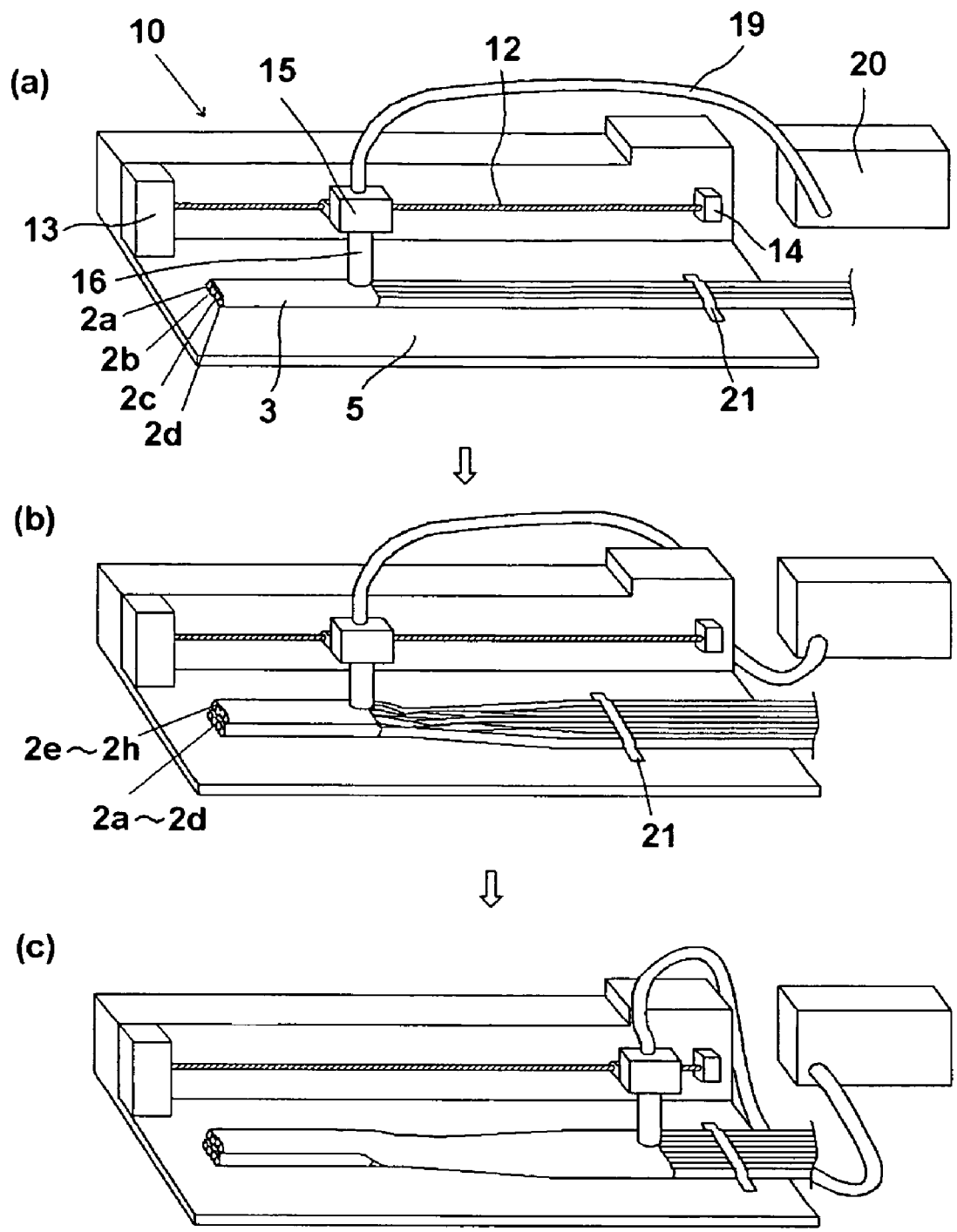
FIG. 23 is a process diagram explaining a method of producing an optical fiber wiring sheet in Example 6.

An optical fiber wiring sheet according to an embodiment of the present invention, wherein coated optical fibers branching at an optical-fiber branching part were stacked on top of one another to form multiple optical-fiber aligning sections, was produced based on the process illustrated in FIG. 23. The application apparatus used comprised a single-axis control robot (10) and a material feeding apparatus (20). On this application apparatus, the single-axis control robot had a substrate with two-dimensional plane (5) on which to place coated optical fibers. It also had a ball-screw shaft (12) extending in the longitudinal direction, with a drive motor (13) provided on one end of the ball-screw shaft, while the other end was supported by a bearing (14). This ball screw engaged with a movable unit (15) by means of threads, and on this movable unit a needle (16) vertically movable to supply material was installed perpendicular to the stage surface. The needle was connected to the material feeding apparatus via a flexible rubber pipe (19).

The coated optical fibers were moved by hand relative to the substrate, and UV setting resin (Viscotac PM-654; manufactured by Osaka Organic Chemical Industry) was used as the covering material for affixing the single-layer optical-fiber aligning section and optical-fiber rearranging part. A dispenser was used to supply the covering material.

First, four 30-cm long coated optical fibers (2a through 2d) (Quartz Single-mode Fiber manufactured by Sumitomo Electric Industries; outer diameter 0.25 mm) were aligned in parallel on a substrate with two-dimensional plane, and affixed using adhesive tape (21). Next, the needle was affixed on the movable unit so that the tip comes at a height of 0.1 mm from the optical fiber surface, and then the needle was moved to the application starting position over the part to become an optical-fiber aligning section, with the needle center adjusted to the width center of four coated optical fibers. Then, the needle was moved in the axial direction of optical fibers to apply a covering material (3) over the top surface of coated optical fibers (FIG. 23 (a)). Next, the applied covering material was irradiated with ultraviolet light using a UV lamp (for 10 seconds at an irradiation intensity of 20 mW/cm$^2$) to produce a single-layer optical fiber aligning section.

Two structures, each having a single-layer optical-fiber aligning section covered on one side, as produced above, were prepared. The optical-fiber aligning sections of these two structures were then stacked on top of each other, and the uncovered parts of the coated optical fibers at the bottom (2a through 2d) and coated optical fibers at the top (2e through 2h) were alternately placed and aligned into a single layer. Also, the position of 2b was swapped with the position of 2c to wire the coated optical fibers in the sequence of 2a, 2e, 2c, 2f, 2b, 2g, 2d and 2h. At this time, the aforementioned optical-fiber aligning sections and non-covered parts were affixed using adhesive tape (21) to apply a constant tension on the coated optical fibers (FIG. 23 (b)). Next, a covering material was applied over the coated optical fibers in the same manner as described above, and the covering material was cured under ultraviolet light to obtain an optical fiber wiring sheet having stacked optical-fiber aligning sections on one end, and a single-layer optical fiber aligning section on the other (FIG. 23 (c)). The needle height was adjusted to 0.5 mm from the optical fiber surface at the branching section, and 0.1 mm from the optical fiber surface at the optical-fiber aligning sections on the other side.

By rearranging coated optical fibers during production of optical fiber wiring sheets, as explained above, the alignment sequence of optical fibers could be changed to provide desired wiring positions matching the input/output ports. Also, the alignment and affixing of coated optical fibers in a manner leaving no space in between achieved a compact structure equivalent to one using conventional optical fiber tapes. Since the coated optical fibers at the optical-fiber aligning sections and optical-fiber branching section were covered with the same covering material, cracking and peeling did not occur between the optical-fiber aligning sections and optical-fiber branching section, and production efficiency also increased.

Example 7

An optical fiber wiring sheet was produced in the same manner as in Example 6, except that thermosetting silicone rubber (KE1800; manufactured by Shin-Etsu Chemical) was used as the covering material over the optical-fiber aligning sections and optical-fiber branching section. Curing was carried out with a dryer by heating for one hour at 120° C.

The optical fiber wiring sheet produced in this example offered excellent flexibility because of the silicone rubber used as the covering material over the optical-fiber aligning sections. This resulted in good workability since the optical fiber wiring sheet could be bent flexibly during handling.

Example 8

An optical fiber wiring sheet having the structure shown in FIG. 18, namely, an optical fiber wiring sheet having stacked optical-fiber aligning sections on one side of an optical-fiber branching section affixed to a substrate, was produced. Specifically, two structures, each having a single-layer optical-fiber aligning section covered on one side, as produced using the same method and material as described in Example 7, were prepared. Then, these optical-fiber aligning sections were stacked in such a way that an optical-fiber branching section is formed on a polyimide film as the substrate (4) of 3 mm×40 mm in size and 125 µm in thickness and having an adhesive layer of 100 µm in thickness on top. The coated optical fibers were then rearranged to form an optical fiber branching section having coated optical fibers affixed to the polyimide film. Next, the same covering material specified above was applied over the coated optical fibers at the optical-fiber aligning section, after which the covering material was dried. Then, the optical-fiber branching section was guided through a heat-shrinkable fiber protection sleeve (9) made of synthetic resin tube (FPS-5 protection sleeve manufactured by Sumitomo Electric Industries), after which the tube was heated for one minute using a heater to affix the optical-fiber branching section. By affixing the optical-fiber branching section to the substrate as shown in this example, the shapes of intersecting optical fibers were maintained and there was no optical loss during use due to micro-bends.

Example 9

An optical fiber wiring sheet having the structure illustrated in FIG. 18 was produced, as follows, with color plates affixed for identifying the rearranged coated optical fibers.

First, color plates for optical-fiber rearranging identification were prepared. These color plates were produced by printing red and blue markers (1 mm×3 mm) on a PET film (3 mm×5 mm×100 µm).

Except for using these color plates for optical-fiber rearranging identification, an optical fiber wiring sheet was produced in the same manner as in Example 8. Specifically, when the optical-fiber branching section was guided through a heat-shrinkable fiber protection sleeve (9) (FPS-5 protection sleeve manufactured by Sumitomo Electric Industries) in Example 8, the color plates were inserted into the heat-shrinkable tube. The remaining steps of producing the optical fiber wiring sheet conformed to Example 8. By providing pre-fabricated identification plates as shown in this example, mistaken use by operators of wrong optical fiber wiring sheets having different rearranging patterns could be prevented. As miswiring was prevented, efficiency of connection process improved further.

The present application claims priority to Japanese Patent Application No. 2004-313003, filed Oct. 27, 2004, No. 2004-362162, filed Dec. 15, 2004, and No. 2005-094176, filed Mar. 29, 2005, the disclosure of which is incorporated herein by reference in their entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. An optical fiber wiring sheet comprising:
   at least one optical-fiber aligning section comprising a plurality of two-dimensionally aligned and wired coated optical fibers; and
   at least one optical-fiber branching part where at least one of the plurality of coated optical fibers branches off as a branching coated optical fiber from the remaining coated optical fibers,
   wherein the coated optical fibers have ends which constitute optical input/output ports,
   wherein the optical-fiber aligning section further comprises an optical-fiber rearranging part where the alignment order of the coated optical fibers changes
   wherein the optical-fiber aligning section having the optical-fiber rearranging part forms a loop,
   wherein the at least one optical-fiber branching part comprises at least one inside optical-fiber branching part and at least one outside optical-fiber branching part, wherein the ends of the branching coated optical fibers of the at least one inside optical-fiber branching part and the at least one outside optical-fiber branching part constitute the optical input/output ports disposed inside and outside the loop, respectively.

2. The optical fiber wiring sheet as claimed in claim 1, wherein the plurality of coated optical fibers are integrally covered with a covering material.

3. The optical fiber wiring sheet as claimed in claim 2, wherein only one side of the optical-fiber aligning section, or the optical-fiber aligning section and the optical-fiber branching part, is covered with the covering material.

4. The optical fiber wiring sheet as claimed in claim 2, wherein the covering material is silicone rubber.

5. The optical fiber wiring sheet as claimed in claim 2, wherein the covering material forms a covering layer having a tear strength of 29 kgf/cm or less.

6. The optical fiber wiring sheet as claimed in claim 1, wherein the optical-fiber branching part is affixed by a protective member.

7. The optical fiber wiring sheet as claimed in claim 6, wherein the protective member is selected from the group consisting of a sheet member with an adhesive layer, and a resinous member.

8. The optical fiber wiring sheet as claimed in claim 6, wherein the optical-fiber branching part is fixedly interposed between two sheet members.

9. The optical fiber wiring sheet as claimed in claim 8, wherein one of the two sheet members is larger than the other sheet member.

* * * * *